US00RE38451E

(19) United States
(12) Reissued Patent
Veenstra

(10) Patent Number: US RE38,451 E
(45) Date of Reissued Patent: Mar. 2, 2004

(54) UNIVERSAL LOGIC MODULE WITH ARITHMETIC CAPABILITIES

(75) Inventor: Kerry S. Veenstra, San Jose, CA (US)

(73) Assignee: Altera Corporation, San Jose, CA (US)

(21) Appl. No.: 09/792,342

(22) Filed: Feb. 20, 2001

Related U.S. Patent Documents

Reissue of:
(64) Patent No.: 5,436,574
Issued: Jul. 25, 1995
Appl. No.: 08/153,321
Filed: Nov. 12, 1993

U.S. Applications:
(63) Continuation of application No. 08/900,070, filed on Jul. 24, 1997, now abandoned.

(51) Int. Cl.[7] ..... H03K 19/173
(52) U.S. Cl. ..... 326/39; 326/38; 326/41; 326/40; 326/44
(58) Field of Search ..... 326/38–41, 113

(56) References Cited

U.S. PATENT DOCUMENTS 3,579,119 A * 5/1971 Yau et al. ..... 326/37
4,229,803 A * 10/1980 Rhodes ..... 708/701
4,541,067 A * 9/1985 Whitaker ..... 326/113
4,825,105 A * 4/1989 Holzle ..... 326/104
4,870,302 A * 9/1989 Freeman ..... 326/41
4,912,339 A * 3/1990 Bechade et al. ..... 327/410
5,162,666 A * 11/1992 Tran ..... 307/243
5,198,705 A * 3/1993 Galbraith et al. ..... 326/37
5,220,213 A * 6/1993 Chan et al. ..... 326/40
5,274,581 A 12/1993 Cliff et al.
5,349,250 A * 9/1994 New ..... 307/465

OTHER PUBLICATIONS

Universal Logic Modules by Harold S. Stone, Chapter IV of Recent Developments in Switching Theory pp. 229–254, by Academic Press (1971).*

"FLEX 8000 Programmable Logic Device Family," product Data Sheet May 1993, ver. 2, Altera Corporation Altera Corporation 101 Innovation Drive San Jose, CA 95134 (1993).

"FLEX Programmable Logic," Product Information Bulletin Sep. 1992, ver. 1, Altera Corporation Altera Corporation 101 Innovation Drive San Jose, CA 95134 (1992).

* cited by examiner

*Primary Examiner*—Vibol Tan
(74) *Attorney, Agent, or Firm*—Townsend and Townsend and Crew LLP

(57) ABSTRACT

A universal logic module for use in a programmable logic device, capable of generating all logical functions of three variables or less. The universal logic module also implements a full adder with carry propagation.

39 Claims, 3 Drawing Sheets

UNIVERSAL LOGIC MODULE WITH ARITHMETIC CAPABILITIES

Matter enclosed in heavy brackets [ ] appears in the original patent but forms no part of this reissue specification; matter printed in italics indicates the additions made by reissue.

*This application is a continuation of U.S. reissue application Ser. No. 08/900,070, filed Jul. 24, 1997, now abandoned, which is a reissue of U.S. patent application Ser. No. 08/153,321, filed Nov. 12, 1993, now U.S. Pat. No. 5,436,574, which are incorporated by reference.*

BACKGROUND OF THE INVENTION

This invention relates in general to electronic circuits for generation of combinatorial logic. More particularly, this invention relates to a universal logic module for use in programmable logic devices (PLDs).

A logic cell is the fundamental building block of a PLD. Each logic cell typically includes a logic array section to implement combinatorial ("sum of the products") logic and a register to provide for sequential logic. When combined together in large numbers inside a PLD, they facilitate implementation of complex combinatorial as well as sequential logic. Therefore, versatility and cell size are among the more important considerations in design of logic cells for PLDs.

There exist differing approaches to implementing the combinatorial logic section of a PLD logic cell. One approach employs electrically programmable read only memory (EPROM) elements to implement a programmable AND array that is followed by fixed OR logic. Another method of implementing the programmable combinatorial logic uses look-up tables that can be programmed using random access memory (RAM) cells. Either method requires a number of programmable elements that must be configured for a particular logic function before input variables are applied. Furthermore, existing logic cells tend to be inflexible when implementing frequently occurring specialized functions. For example, two logic cells are required to implement a full adder with carry output using typical existing logic cells.

There is, therefore, room for improvement in methods of implementing combinatorial logic for logic cells in PLDs.

SUMMARY OF THE INVENTION

The present invention provides a small and fast universal logic module (ULM) capable of realizing all Boolean functions of three or fewer variables. The ULM of the present invention further includes a separate output that can realize the carry output of a full adder.

In a preferred embodiment, the present invention provides, in a programmable logic device, a ULM having five input terminals and an output terminal. The ULM includes two 4:1 multiplexers and 2:1 multiplexer. Each 4:1 multiplexer includes 4 data inputs, 2 select inputs and one output. The outputs of the 4:1 multiplexers feed two data inputs of the 2:1 multiplexer, whose output forms the ULM output. The eight data inputs of the two 4:1 multiplexers and their select inputs as well as the select input of the 2:1 multiplexer connect to the five input terminals and their complements. An output of one of the 4:1 multiplexers can be used as a carry output of full adder.

This embodiment of the present invention can realize all Boolean functions of three or fewer variables by assigning the three (or fewer) variables, their complements and the constants 0 and 1 to the five input terminals. Furthermore, this circuit is capable of realizing the carry output of a full adder at a secondary output without any additional circuitry. The ULM, therefore, does not require reconfiguring programmable elements to change its logic functions and is capable of implementing a full adder with carry output. Accordingly, the ULM of the present invention provides a small and versatile combinational circuit for use in PLDs.

A further understanding of the nature and advantages of the present invention may be gained by reference to the following detailed description and diagrams.

DESCRIPTION OF THE SPECIFIC EMBODIMENTS

A universal logic module (ULM) is a combinatorial logic circuit that can produce a set of multi-variable logic functions by only manipulating the application of variables to its several input terminals. The number of all possible unique logical functions of three variables (or less) is given by the expression [2(23)], which is equal to [2**8] or 256. It has long been known that if both true and complements of all input variables as well as the resulting output function are available, the number of nondegenerate (or canonical forms of) three-variable logic functions can be reduced to ten. That is, all Boolean functions of three variables, x, y and z, can be converted into one of ten functions f(x,y,z) by some combination of inverting the inputs, inverting the output, and permuting the inputs.

Figure 1:
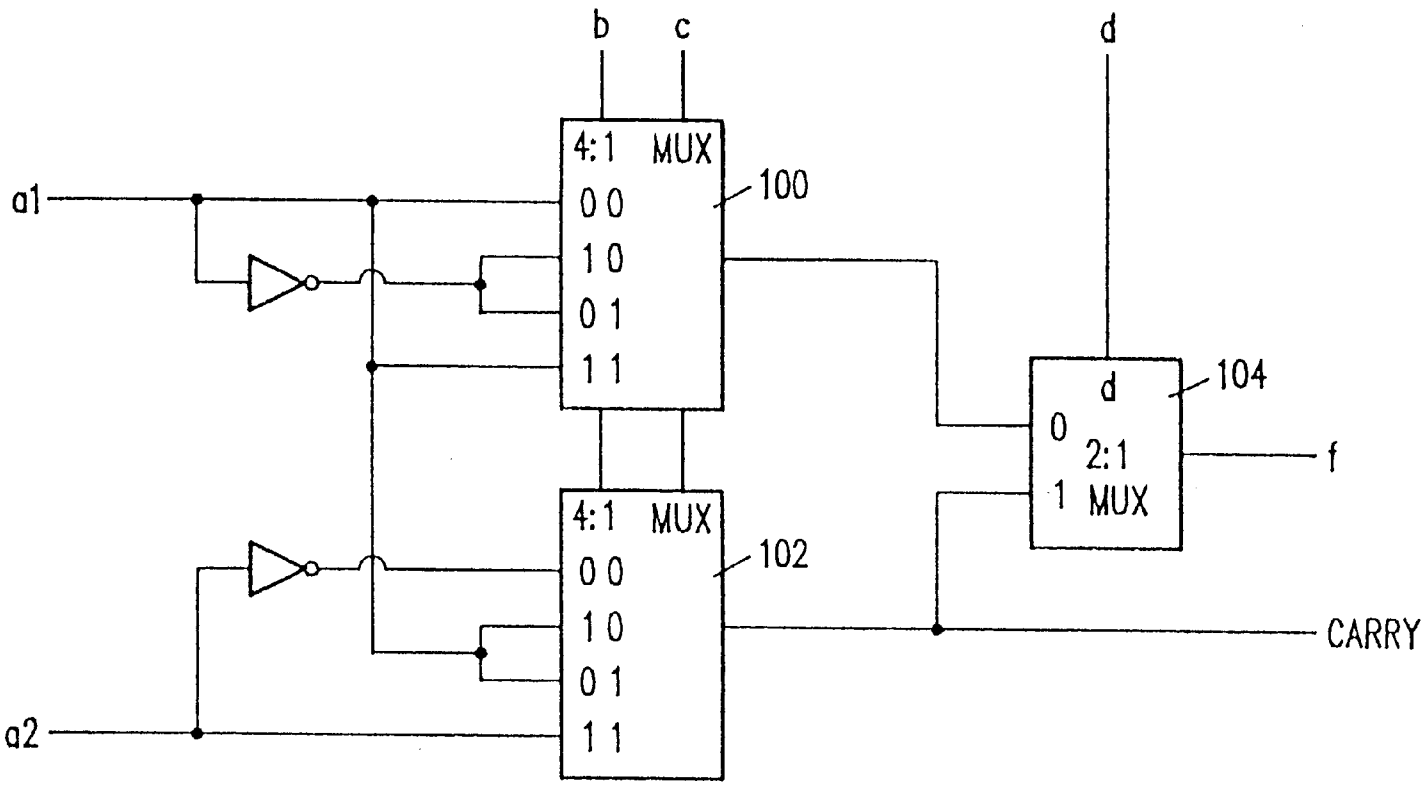
FIG. 1 is a logic diagram of the ULM of the present invention.

FIG. 1 shows a logic diagram of the three-variable ULM of the present invention. The ULM includes two 4:1 multiplexers 100 and 102, whose singular outputs feed two data inputs of a 2:1 multiplexer 104, respectively. An output of multiplexer 104 forms the output f of the ULM. Two select inputs of multiplexer 100 connect to the two select inputs of multiplexer 102 and connect to inputs b and c, respectively. The eight data inputs of the two 4:1 multiplexers 100 and 102 connect to various permutations of two inputs a1 and a2, and their complements. A select input of multiplexer 104 connects to a fifth input d. The output of multiplexer 102, carry, can realize a carry output of a full adder. The ULM, therefore, has five inputs a1, a2, b, c and d, and output f, and a carry output.

Table 1 shows one example of how the three input variables x, y and z, their complements and the constants 0 and 1 can be assigned to the five inputs of the ULM of FIG. 1, in order to realize the ten different canonical forms of three-variable functions listed in the f(x,y,z) column.

TABLE 1

| | a1 | a2 | b | c | d | f(x,y,z) | carry(x,y,z) |
|---|---|---|---|---|---|---|---|
| 1 | x | y | x | z | z | xyz | N.A. |
| 2 | 0 | x | y | z | 1 | xyz + x'y'z' | N.A. |
| 3 | 0 | x | y' | y' | z | (x XOR y)z | N.A. |
| 4 | 0 | x | y' | z | y' | (x + y)z | N.A. |

TABLE 1-continued

| | a1 | a2 | b | c | d | f(x,y,z) | carry(x,y,z) |
|---|---|---|---|---|---|---|---|
| 5 | 0 | 0 | x | y | z | xy'z' + x'yz' + x'y'z | N.A. |
| 6 | 0 | y | 0 | x | z | xz' + x'y'z | N.A. |
| 7 | x | 1 | y | z | 1 | xy + xz + yz | N.A. |
| 8 | x | y | 1 | 1 | z | xz' + yz | N.A. |
| 9 | z | z | 1 | x' | y' | xy XOR z | N.A. |
| 10 | x | 1 | y | z | 0 | x XOR y XOR z | xy + xz + yz |

Application of DeMorgan's Law allows, for example, the function f(x,y,z)=x+y+z to be realized by using the first line in Table 1 that defines the function f(x,y,z)=xyz and inverting all inputs and the output. The function f(x,y,z)=xz XOR y can be realized from the ninth function f(x,y,z)=xy XOR z in Table 1, by swapping y and z. All functions of fewer than three variables can be readily realized by selecting an appropriate three-variable function from Table 1 and setting one or more of its inputs to 0 or 1. For example, the ninth function f(x,y,z)=xy XOR z converts to f(x,y)=xy by setting z to 0. Through these known methods the ULM of FIG. 1 can realize all 256 functions of three or fewer variables using the assignments shown in Table 1.

The ULM of FIG. 1 can also implement a two-input full adder with carry output. The tenth function f(x,y,z)=x XOR y XOR z in Table 1 allows the ULM to implement a full adder by assigning, for example, x and y to the two inputs and z to carry-in ($C_{in}$). The output multiplexer 102 in FIG. 1 generates the carry output function xy+xz+yz as shown on the last line of Table 1.

Figure 2:
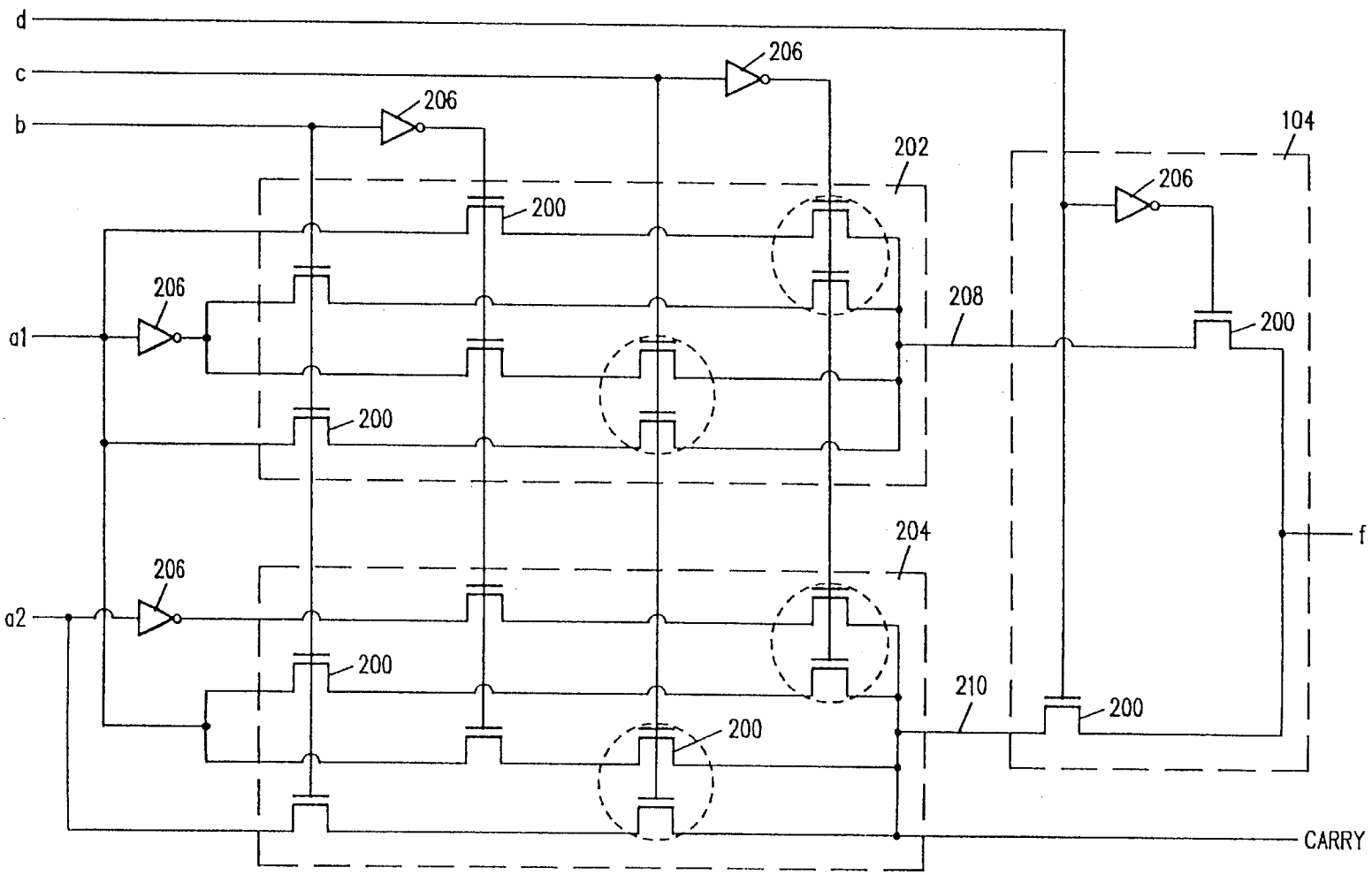
FIG. 2 is a circuit schematic showing a transistor implementation of the ULM of the present invention.

FIG. 2 shows a preferred embodiment of the circuit implementation of the ULM of FIG. 1. The 4:1 multiplexers are implemented using eight pass gates 200 arranged in four rows of two serially-connected transistors as shown in blocks 202 and 204. The gate terminals of pass gates 200 receive the select signals c and b and their complements. Two inverters 206 provide the complements of signals c and b to both multiplexer blocks 202 and 204. The four transistor rows of each block 202 and 204 receive signals a1, a2 and their complements at the input side, and connect together to form outputs 208 and 210, respectively, at the output side. The 2:1 multiplexer 104 includes two transistors 200, receiving outputs 208 and 210 at one end and connecting together at the other end to form output terminal f. The select signal d and its complement feed the gate terminals of transistors 200 of the 2:1 multiplexer 104. The output 210 of multiplexer block 204 forms the carry output. Inverters 206 generate the complements of the five input signals. It is possible to further reduce the transistor count for the circuit in FIG. 2. Because the circled pairs of transistors 200 act logically as two parallel transistors, they can be combined into a single, larger transistor, without affecting the operation of the circuit. This reduces the device count by four transistors.

The ULM of the present invention is used as the combinatorial circuit of a logic cell in a programmable logic device (PLD). The logic cell typically includes a programmable flip-flop which receives the output f at its input. The flip-flop enables the PLD to perform sequential logic. The PLD comprises a large number of logic cells that connect together through a programmable interconnect array. To drive other circuitry, the ULM outputs (f and carry) may require buffering.

Figure 3B:
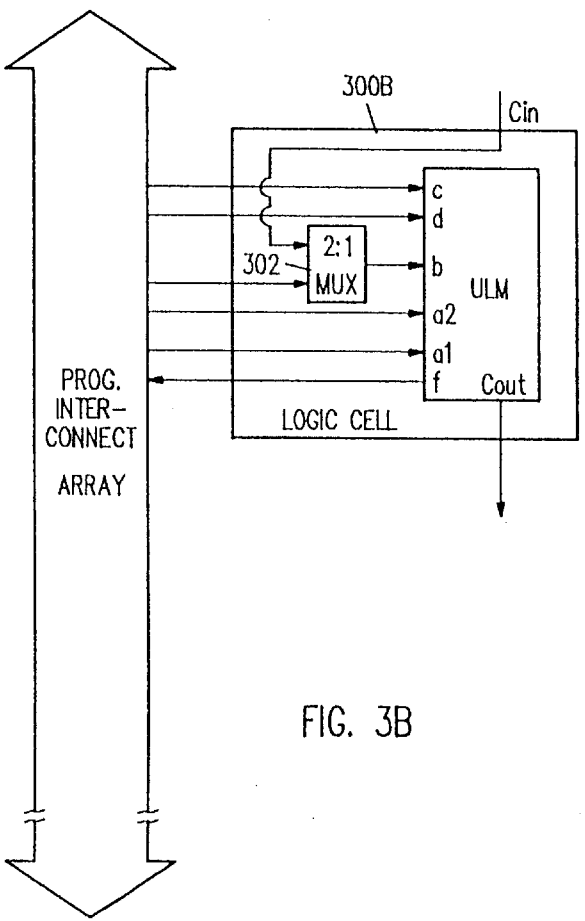
FIGS. 3A and 3B show logic cells using the ULM of the present invention implementing carry propagation circuitry.
Figure 3A:
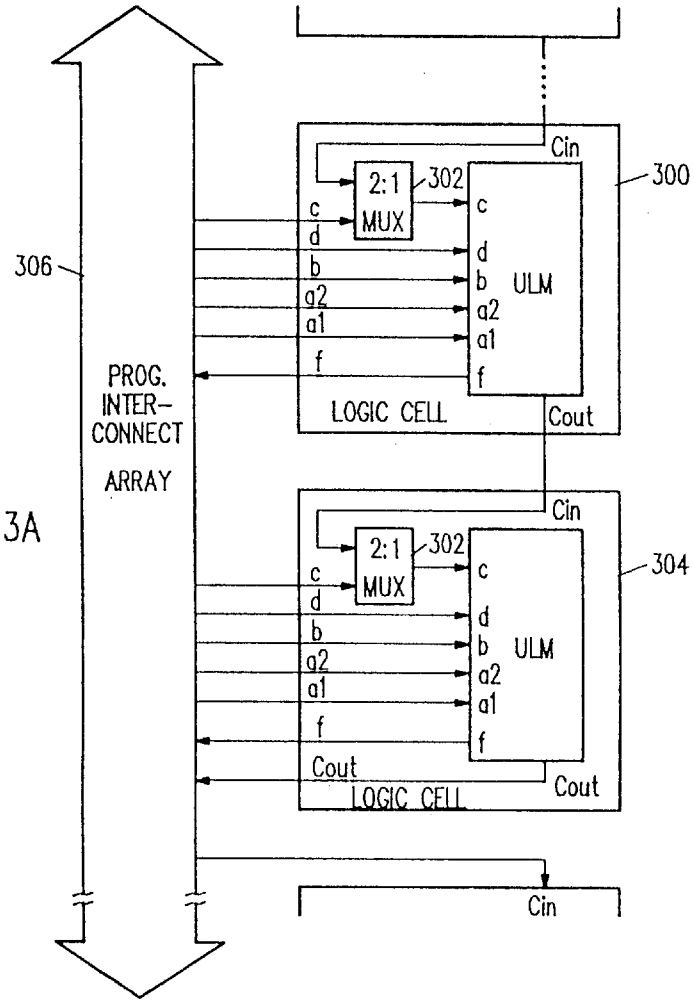

One approach to implementing the carry propagation circuitry is to use an additional 2:1 multiplexer as part of the ULM and propagate carry from cell to cell without using the interconnect array. Alternatively, the carry output can feed into the programmable interconnect array before connecting to a carry input of another cell. FIG. 3A shows both these implementations in one circuit. Logic cells 300 includes a 2:1 multiplexer 302 that receives the signals c and $c_{in}$ at its input terminals. The output of multiplexer 302 connects to the terminal of the ULM that was previously connected to the c signal. Input b can also be used as the carry input as shown in FIG. 3B), allowing the designer to select the one (i.e. either or c and b) that optimizes circuit layout (e.g. the input terminal closest to the carry terminal). The select input of multiplexer 302 is controlled by a programmable architecture bit (not shown). This logic cell 300 shows carry output feeding the $c_{in}$ terminal of the next module 304 locally. The advantage of locally propagating the carry is in area savings as well as speed. Logic cell 304 is similarly constructed as logic cell 300 except for the fact that the carry output signal is not locally propagated, instead it connects to the programmable interconnect array 306. This will enable the carry output signal to connect to $c_{in}$ of any other logic cell at the cost of silicon area and speed.

In conclusion, the present invention provides a small and fast universal logic module (ULM) for use in programmable logic devices, which is capable of realizing all Boolean functions of three or fewer variables. The ULM of the present invention further includes a separate output that can realize the carry output of a full adder. While the above is a complete description of the preferred embodiments of the present invention, it is possible to use various alternatives, modifications and equivalents. For example, the ULM circuit of FIG. 2 may further provide for a programmable inversion of the output f. Therefore, the scope of the present invention should be determined not with reference to the above description but should, instead, be determined with reference to the appended claims, along with their full scope of equivalents.

What is claimed is:

1. In a programmable logic device having a programmable interconnect array, a universal logic module having five input variables and an output, comprising:

a first multiplexer having a first and a second data input coupled to a first one of the five input variables, a third and fourth data input coupled to an inverse of said first one of the five input variables, a first select input coupled to a second one of the five input variables, a second select input coupled to a third one of the five input variables, and an output;

a second multiplexer having a first and a second data input coupled to said first one of the five input variables, a third data input coupled to a fourth one of the five input variables, a fourth data input coupled to an inverse of said fourth one of the five input variables, a first select input coupled to said second one of the five input variables, a second select input coupled to said third one of the five input variables, and an output; and a third multiplexer having a first data input coupled to said output of said first multiplexer, a second data input coupled to said output of said second multiplexer, a select input coupled to a fifth one of the five input variables, and an output coupled to the output of the universal logic module.

2. The universal logic module of claim 1 further comprising a second output coupled to said output of said second multiplexer, said second output for carrying a carry output signal when the universal logic module implements an adder function.

3. The universal logic module of claim 1, wherein said first and second multiplexers are 4:1 multiplexers each comprising eight pass gates arranged in four rows of two serially-coupled pass gates.

4. The universal logic module of claim 1, wherein said third multiplexer is a 2:1 multiplexer comprising two pass gates.

5. The universal logic module of claim 2 further comprising a fourth multiplexer coupled between said third input variable and its corresponding data input, for selectively coupling one of said third input variable and a carry input signal from another universal logic module to said corresponding data input.

6. The universal logic module of claim 2 further comprising a fourth multiplexer coupled between said fourth input variable and its corresponding data input, for selectively coupling one of said fourth input variable and a carry input signal from another universal logic module to said corresponding data input.

7. The universal logic module of claim 5, wherein said fourth multiplexer is a 2:1 multiplexer comprising two pass gates.

8. The universal logic module of claim 5, wherein said carry output signal couples to a carry input of a succeeding module directly.

9. The universal logic module of claim 5, wherein said carry output signal couples to the programmable interconnect array before coupling to a carry input of another universal logic module.

10. In a programmable logic device having a programmable interconnect array, a universal logic module having five input variables, a first output and a second output, comprising:

a first 4:1 multiplexer having binary 0 and binary 3 data inputs coupled to a first one of the five input variables, binary 1 and binary 2 data inputs coupled to an inverse of said first one of the five input variables, a first select input coupled to a second one of the five input variables, a second select input coupled to a third one of the five input variables, and an output;

a second 4:1 multiplexer having binary 1 and binary 2 data inputs coupled to said first one of the five input variable, binary 0 and binary 3 data inputs coupled to a true and complement of a fourth one of the five input variables, respectively, a first select input coupled to said second one of the five input variables, a second select input coupled to said third one of the five input variables, and an output; and a 2:1 multiplexer having a first data input coupled to said output of said first multiplexer, a second data input coupled to said output of said second multiplexer, a select input coupled to a fifth one of the five input variables, and an output coupled to the first output of the universal logic module, wherein said output of said second multiplexer provides a carry output at the second output of the universal logic module when the universal logic module implements an adder function.

*11. In a programmable circuit having a programmable interconnect array, a first logic cell comprising:*

*a dedicated carrier multiplexer coupled to receive an input variable and a carry input signal from a second logic cell; and*

*a logic function circuit that is capable of performing Boolean functions of its input signals to generate a carry output signal,*

*wherein the dedicated carrier multiplexer selectively couples the input variable and the carry input signal to an input of the logic function circuit.*

*12. The logic cell of claim 11, wherein said dedicated multiplexer is a 2:1 multiplexer comprising two pass gates.*

*13. The first logic cell of claim 11, wherein the logic function circuit couples the carry output signal to a carry input of a third logic cell directly.*

*14. The first logic cell of claim 11, wherein the logic function circuit couples the carry output signal to the programmable interconnect array before coupling the carry output signal to a carry input of a third logic cell.*

*15. A first logic cell in a programmable logic device, comprising:*

*a function generator circuit capable of implementing a Boolean function of at least four input signals to generate an output signal that is provided to a programmable interconnect structure and a carry output signal that is provided to a second logic cell;*

*a carry input line to receive a carry signal from a third logic cell in the programmable logic device; and*

*a dedicated carry multiplexer coupled to the carry input line, wherein the dedicated carrier multiplexer can provide a signal on the carry input line to an input of the function generator circuit.*

*16. A dedicated carry multiplexer in a programmable circuit comprising:*

*a first input coupled to receive a signal on a programmable interconnect;*

*a second input coupled to receive a carry output of a first logic cell; and*

*an output connectable to a logic function circuit capable of generating Boolean functions of its input signals to provide a carry output signal to a second logic cell and an output signal to the programmable interconnect.*

*17. The dedicated carry multiplexer of claim 16 wherein the logic function circuit generates any Boolean function of at least four input signals that provide three variables, and the logic function circuit is capable of performing ten different forms of three-variable functions on the four input signals.*

*18. A configurable electronic device comprising:*

*a plurality of logic cells, at least one logic cell comprising an output and a plurality of inputs, wherein the at least one logic cell programmably performing logical operations; and*

*an interconnect structure programmably connecting the outputs of one of the logic cells to inputs of another of the logic cells*

*wherein the at least one logic cell further comprises:*

*a carry input line;*

*a selector with a first selectable input coupled to receive a direct carry output of a first adjacent logic cell and a second selectable input coupled to the interconnect structure; and*

*a function generator capable of generating a plurality of Boolean functions of at least three inputs, wherein an output of the selector is coupled to an input of the function generator.*

*19. The configurable electronic device according to claim 18 wherein the function generator provides a carry output signal to a second adjacent logic cell without routing through the interconnect structure.*

*20. The configurable electronic device as recited in claim 18 wherein the function generator provides a carry output signal to the interconnect structure.*

*21. A dedicated carry multiplexer in a programmable logic device comprising:*

*a first input connectable to a signal from a programmable interconnect;*

*a second input connected to a carry output of a first logic cell; and*

*an output connected to a logic function circuit capable of performing a plurality of Boolean functions of four inputs signals.*

*22. The dedicated carry multiplexer of claim 21 wherein the logic function circuit provides a carry output signal that is routed directly to a second logic cell.*

*23. A first logic cell in a programmable logic device, comprising:*

*a carry input line coupled to receive a carry signal from a second logic cell in the programmable logic device;*

*a function generator circuit that has first, second, third, and fourth inputs that are each coupled to receive one of four input signals from a programmable interconnect structure; and*

*a dedicated carry multiplexer coupled to the carry input line, wherein the dedicated carrier multiplexer receives the carry signal from the carry input line.*

*24. The first logic cell of claim 23 wherein:*

*the function generator circuit generates a carry output signal that is provided to a third logic cell in the programmable logic device.*

*25. The first logic cell of claim 23 wherein:*

*the function generator circuit generates an output signal that is provided to the programmable interconnect structure.*

*26. A first logic cell in a programmable logic device, comprising:*

*a carry input line coupled to receive a carry signal from a second logic cell in the programmable logic device;*

*a function generator circuit that receives three input signals from a programmable interconnect structure and that generates a carry output signal; and*

*a dedicated carry multiplexer coupled to the carry input line, wherein the dedicated carrier multiplexer receives the carry signal from the carry input line.*

*27. The first logic cell of claim 26:*

*the function generator circuit is capable of performing all Boolean functions of three variables using ten canonical forms of three-variable logic functions.*

*28. The first logic cell of claim 26:*

*the function generator circuit receives the carry signal from the dedicated carry multiplexer.*

*29. A first logic cell in a programmable logic device, comprising:*

*a carry input line coupled to receive a carry signal from a second logic cell in the programmable logic device;*

*a function generator circuit that receives input signals from a programmable interconnect structure; and*

*a dedicated carry multiplexer coupled to the carry input line, wherein the dedicated carrier multiplexer receives the carry signal from the carry input line,*

*and the first logic cell generates a carry output signal that is provided to the programmable interconnect structure.*

*30. The first logic cell of claim 29 wherein:*

*the function generator circuit generates the carry output signal.*

*31. The first logic cell of claim 29 wherein:*

*the function generator circuit receives four input signals from the programmable interconnect structure.*

*32. A first logic cell in a programmable logic device, comprising:*

*a carry input line coupled to receive a carry signal from a second logic cell in the programmable logic device, wherein the first logic cell is coupled to only receive a carry signal from one other logic cell;*

*a function generator circuit that receives input signals from a programmable interconnect structure; and*

*a dedicated carry multiplexer coupled to the carry input line, wherein the dedicated carrier multiplexer receives the carry signal from the carry input line.*

*33. The first logic cell of claim 32 wherein:*

*the function generator is capable of performing any Boolean function of three variables.*

*34. The first logic cell of claim 32 wherein:*

*the function generator generates a carry output signal that is provided to a third logic cell, and the function generator generates a second output signal that is provided to the programmable interconnect structure.*

*35. A first logic cell in a programmable logic device, comprising:*

*a carry input line coupled to receive a carry signal from a second logic cell in the programmable logic device;*

*a first function generator circuit that receives input signals from a programmable interconnect structure;*

*a second function generator circuit that receives input signals from the programmable interconnect structure;*

*a first multiplexer that receives an output signal from the first function generator circuit and an output signal from the second function generator circuit; and*

*a dedicated carry multiplexer coupled to the carry input line, wherein the dedicated carrier multiplexer receives the carry signal from the carry input line.*

*36. The first logic cell of claim 35 wherein:*

*the second function generator circuit generates a carry output signal that is provided to a third logic cell.*

*37. The first logic cell of claim 35 wherein:*

*the first multiplexer generates an output signal that is provided to the programmable interconnect structure.*

*38. A first logic cell in a programmable logic device, comprising:*

*a carry input line coupled to receive a carry signal from a second logic cell in the programmable logic device;*

*a function generator circuit that receives input signals from a programmable interconnect structure; and*

*a dedicated carry multiplexer coupled to the carry input line, wherein the dedicated carrier multiplexer receives the carry signal from the carry input line,*

*and the first logic cell generates a carry output signal that is only provided to a third logic cell.*

*39. The first logic cell of claim 38 wherein:*

*the functional generator circuit is coupled to receive the carry input signal from the dedicated carry multiplexer and to generate the carry output signal.*

* * * * *